United States Patent [19]
Nilsson

[11] Patent Number: 4,927,591
[45] Date of Patent: May 22, 1990

[54] CONTAINER, METHOD AND APPARATUS FOR MANUFACTURING THE SAME

[75] Inventor: Torsten Nilsson, Löddeköpinge, Sweden

[73] Assignee: Petainer S.A., Neuchatel, Switzerland

[21] Appl. No.: 902,456

[22] Filed: Aug. 14, 1986

[30] Foreign Application Priority Data

Dec. 14, 1984 [SE] Sweden ................... 8406373

[51] Int. Cl.⁵ .............. B29C 17/03; B29C 17/07
[52] U.S. Cl. ................... 264/532; 264/533; 264/295; 264/292; 264/296; 264/323; 264/521; 425/387.1; 425/393
[58] Field of Search ............... 264/531–534, 264/292, 294, 296, 295, 323, 521; 425/387.1, 393

[56] References Cited

U.S. PATENT DOCUMENTS

3,681,486  8/1972  Mehnert .................. 264/53.3
3,757,718  9/1973  Johnson .................. 264/292
4,512,735  4/1985  Nilsson et al. ........... 425/533
4,563,325  1/1986  Coffman ................. 264/292
4,565,664  1/1986  Ikehata et al. .......... 264/292

Primary Examiner—Jan H. Silbaugh
Assistant Examiner—Neil M. McCarthy
Attorney, Agent, or Firm—Roberts, Spiecens & Cohen

[57] ABSTRACT

A hollow body (e.g. a container) as well as a method and an apparatus for its manufacture in which an axially directed wall of the body primarily is made of oriented and/or crystallized plastics material. A tubular preform (10d) is fixed in a circumferential region (13d) in the vicinity of the mouth edge (14d) of the preform between mechanical forming devices (30,40), after which the devices, during continued clamping of the circumferential region, are displaced in the axial direction of the preform relative to a mandrel (50). Thus, the mandrel is displaced into the preform during simultaneous expansion thereof and the material is oriented and/or crystallized. In a preferred embodiment there is made a certain compensation of the stretching forces, which arise in the material when inserting the mandrel, by applying a force to the bottom of the preform by a bottom support (75).

26 Claims, 6 Drawing Sheets

CONTAINER, METHOD AND APPARATUS FOR MANUFACTURING THE SAME

FIELD OF THE INVENTION

The present invention relates to a hollow body (e.g. a container) whose axially directed wall(s) comprise(s) oriented and/or crystallized plastic material, in addition to which the invention relates to a method and an apparatus for reshaping a primarily tubular preform of plastic material into the hollow body by means of mechanical shaping devices.

PRIOR ART

It has been previously known to reshape blanks of thermoplastics material into a container, where the blank includes portions of axially oriented material. The reshaping takes place by means of a blowing process, during which the material of the blank is blown against mold walls whose shape corresponds to the shape of the container being produced. Patent publication No. GB 2.076.731 A describes such a technique for the manufacture of a bottle-shaped container.

U.S. Pat. No. 4,381,279 describes a technique where a blank of oriented thermoplastics material is reshaped by a blowing process into a container. Also this patent discloses a technique to remold an oriented blank into a container.

U.S. Pat. No. 4,372,908 reveals a technique where a stretched and oriented blank of thermoplastic material is reshaped into a container by means of one or more mechanical shaping processes. In accordance with the technique revealed in the patent the circumference of the body of the container is reduced during the reshaping of the blank into the container.

There is a considerable need for containers of plastic materials suitable for high-temperature applications and/or storage of liquids under pressure, e.g. storage of soft drinks, beer, etc. High-temperature applications mean e.g. that the contents of filled and sealed containers are pasteurized (60°–70° C.), that the liquid is filled directly into the containers at boiling temperature (warm filling) or that the contents of filled and sealed containers are sterilized (at least 121° C.).

Further requirements in respect of containers of plastic material are that it should be possible to manufacture containers in which the body of the container and its mouth section have cross-sections independent of each other, e.g. the body has a polygonal cross-section while the mouth of the container is circular. The circular shape of the mouth is, as a rule, desirable in order to facilitate sealing of the container.

In order to reduce the unit cost of the containers it is further necessary to adapt the distribution of material in the individual container to estimated mechanical stresses in various parts of the container (mouth, container body and bottom). Additionally, it is also important that in each region (part) of the container material distribution should be as even as possible, since the thinnest and thus the weakest section of each such region determines the stresses which the container is able to withstand. In addition to the material thickness, the mechanical strength of the containers is naturally also determined by the orientation of the material and/or its crystallization. It is especially in the case of thermoplastic material that the thermal crystallization is of importance.

A further requirement for containers of the kind envisaged here and especially for a container intended for high-temperature applications is that the shrinkage which occurs during heating of stretched and oriented thermoplastic material is eliminated or reduced to acceptable values.

In storing liquids under pressure in a container or bottle or can type, it is true in purely physical terms that with an inner pressure in the container its wall material is subjected to a stress that is approximately twice as large in the circumferential direction than in the axial direction. In order to improve the strength of the material in the case of orientable thermoplastic material, the container is molded in accordance with a known and generally applied technique, by means of a blowing process, at the same time as the temperature of the material is adapted to the properties of the material in question, in order to stretch the material during the blowing process and thereby orientate the same.

The blowing technique possesses the disadvantage that the distribution of material during the molding of the container is not fully controllable since, during the expansion of the blank into the container, it is not possible to determine and control exactly where and how the stretching of the material, and thus its orientation, will proceed. Normally, the stretching begins at a number of starting points, whose positions are determined by the prevailing temperature distribution in the material, in addition to stretching forces arising therein. The propagation of expansion, and the stretch ratio obtained are furthermore temperature-dependent, which results in a varying material thickness of the molded container, i.e. even in a section at right-angles to the axial direction the thickness of the container wall varies in the circumferential direction. The additional heating of the material which takes place when it crystallizes through the stretching, achieves in the material an additional uneven temperature distribution which results in an increase in variations in the thickness of the wall in the molded container. Corresponding variations also occur in the axial direction of the container, i.e. in axial sections through regions of primarily equally large circumference, alternately thinner and thicker material portions are present. The wall thickness of the blank is thus selected in accordance with known techniques with regard to the aforementioned uncertainty in the stretching and thinning out of the material, which implies an overdimensioning of the blank, and thus also a surplus of material in the molded container.

In order to attain temperature stability in containers of orientable thermoplastic material, it is known to temperature-stabilize the containers in that during the blowing of the containers the container material is allowed to touch hot mold walls against which the material abuts for a relatively long period (of the order of magnitude of 1–2 minutes). This abutment is realized in that after blowing, an inner overpressure is maintained inside the blown container, whereby the wall material is pressed against the walls of the mold. Long cycle times, however, make this an expensive technique.

SUMMARY OF THE INVENTION

The present invention relates to a technique where all of the aforementioned disadvantages are eliminated. In accordance with the invention one starts with a preform of orientable and/or crystallizable material from which a container is manufactured with high mechanical strength and temperature stability and with a considerably improved material distribution, compared with previously known techniques, in that this is fully controlled. In accordance with the invention, the time requirement for the manufacture of each individual container is also reduced in comparison with that in previous known techniques, in addition to which the invention allows a simplified construction of the production equipment. By means of the invention the quantity of material in each container is thus reduced, the desired temperature stability is achieved, and costs are reduced in comparison to previously known and used techniques.

In accordance with the invention, a preform of plastic material is reshaped, which has the property of being able to be oriented and/or crystallized by a mechanical processing, into a container in a number of consecutive reshaping processes which, in a preferred embodiment, take place in distinctly separate sub-stages. In every such process or stage the material is stretched (extended) preferably in either the axial or the circumferential direction of the future container. By stretching the material every time to a controlled extent, the material accumulates a total stretching (extension) and a reduction in thickness equivalent to that which is required in order to supply the material with the desired and pre-determined orientation or crystallization and thus the necessary strength properties. The controlled stretching and the controlled reduction of the material thickness causes the molded container to have the same material thickness in sections at right-angles to the axis of the container, thereby avoiding the variation in thickness, which containers manufactured in accordance with known techniques have in axial sections through regions of primarily equally large circumference.

In mechanical stretching of the preform or stretching of an intermediate preform formed from the preform in the circumferential direction, there are certain difficulties present in achieving a required degree of stretching in each individual stage of stretching, unless special measures are taken. In accordance with the invention, a primarily ribbon-shaped, circumferential region in the vicinity of the mouth edge of the preform or the intermediate preform is fixed between mechanical devices which displace the preform or the intermediate preform in its axial direction across a mandrel during simultaneous expansion of the article. Since the material of the article is thus subjected to stretching forces, the tendencies towards folding of the material, when the expansion is made in the circumferential direction, are avoided. Especially, the stretching forces are of importance, when reshaping thin-walled articles. It is, in accordance with the invention, also possible in many applications to achieve a required increase of the dimensions in the circumferential direction in a single reshaping stage.

In some embodiments, the tractive forces are supplemented by compressive forces which are applied in the vicinity of the bottom section of the preform, and which are directed towards the mouth of the preform. This technique is employed when the increase in the dimensions in the circumferential direction is large.

In accordance with a preferred embodiment of the invention, the preform or the intermediate preform is reshaped into the container in all sub-stages by use of mechanical reshaping devices. The mechanical stretching (extension or expansion, respectively) takes place in every stage with the material at a specific and controlled temperature which can be selected within a wide range. The choice of temperature is determined however by the special effect which it is required to achieve in the molding stage in question. For materials with a distinct glass transition temperature, hereinafter abbreviated as TG, e.g. the temperature of the material is, in certain, and in general, the initial molding stages, lower than TG, while in the concluding stage or stages the temperature generally exceeds TG. In the case of the material, polyethylene terephthalate, hereinafter abbreviated as PET, the material attains, in a preferred embodiment of the invention, temperatures within the range of 70°–180° C., in connection with the concluding shaping stages, while in the initial shaping stages it generally has a lower temperature.

In certain applications of the invention, e.g. where one intends to obtain a container with a shape which is difficult to achieve by means of mechanical shaping devices, at least one of the shaping stages, and preferably the last one, comprises a blow molding stage. In connection herewith the temperature of the material is, as a rule, set to a temperature close to the maximum temperature at which the material was previously shaped mechanically.

BRIEF DESCRIPTION OF THE DRAWING

The invention is described in greater detail in connection with a number of figures of the drawing, in which.

DETAILED DESCRIPTION OF PREFERRED EMBODIMENTS

Figure 1:
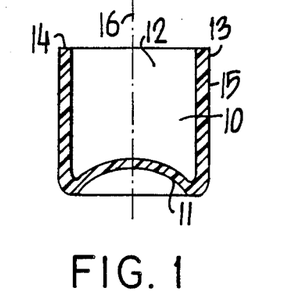
FIGS. 1–5 show the shaping of a preform into an intermediate preform by extension of the preform in its axial direction when the preform passes through a gap that reduces the material thickness.

FIG. 1 shows a preform 10 with a bottom section 11, a mouth 12, a ribbon-shaped, circumferential mouth edge region 13, a mouth edge 14, and an axially directed wall 15, located between the mouth and the bottom section. The central axis of the preform is denoted by reference numeral 16. The preform is, in FIG. 2, placed in an apparatus for temperature setting of the preform material. The apparatus includes a sleeve 91, a mandrel 92 and a bottom support 93. All these devices are provided with channels 97 through which a fluid, such as a liquid passes for individual setting of each device to a certain working temperature. The devices are adjustable to positions where there is formed between them a cavity whose shape substantially corresponds to that of the preform. A preform which is placed in the cavity is thus enclosed on both the inside and the outside by the devices and assumes a temperature which in every part of the preform is determined by the temperatures of the adjoining devices and the time the preform stays in the cavity.

Figure 3:
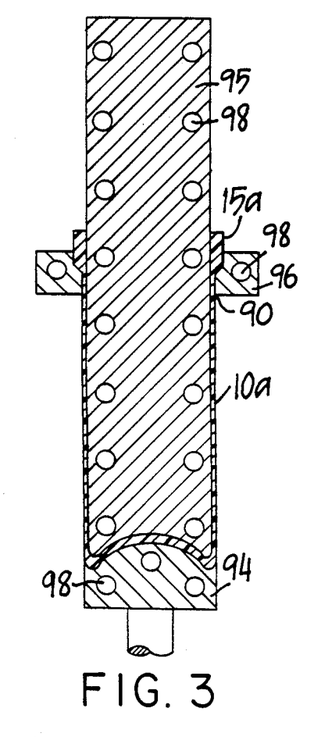
Figure 4:
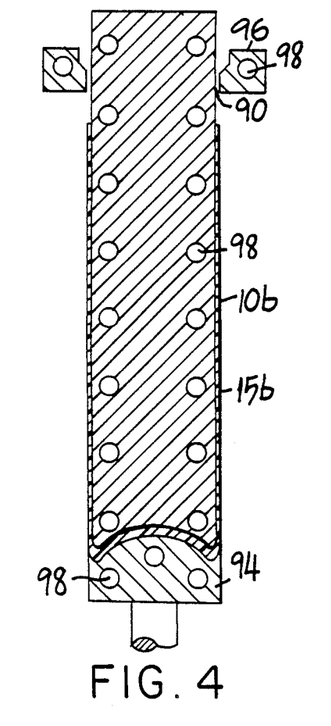

FIGS. 3 and 4 show a basic apparatus for reduction of the material thickness of the preform during its simultaneous extension in the axial direction. The apparatus includes a bottom support 94, a mandrel 95 and a traction device 96 which surrounds the mandrel and is displaced in its axial direction by displacement devices (not shown in the Figures). Between the mandrel and the traction device there is defined a slot 90 the breadth of which is less than the material thickness of the axially directed wall of the preform. The traction devices and-/or the mandrel as well as the bottom support are, as a rule, provided with channels 98 through which fluid, such as a liquid passes for regulation of the temperature of the devices. Depending on the application, heat is either supplied or removed by means of the liquid. There is a preform $10a,b$ located in the apparatus, and its wall $15a,b$, has undergone an axial stretching (extension) and associated crystallization.

Figures 5, 6:
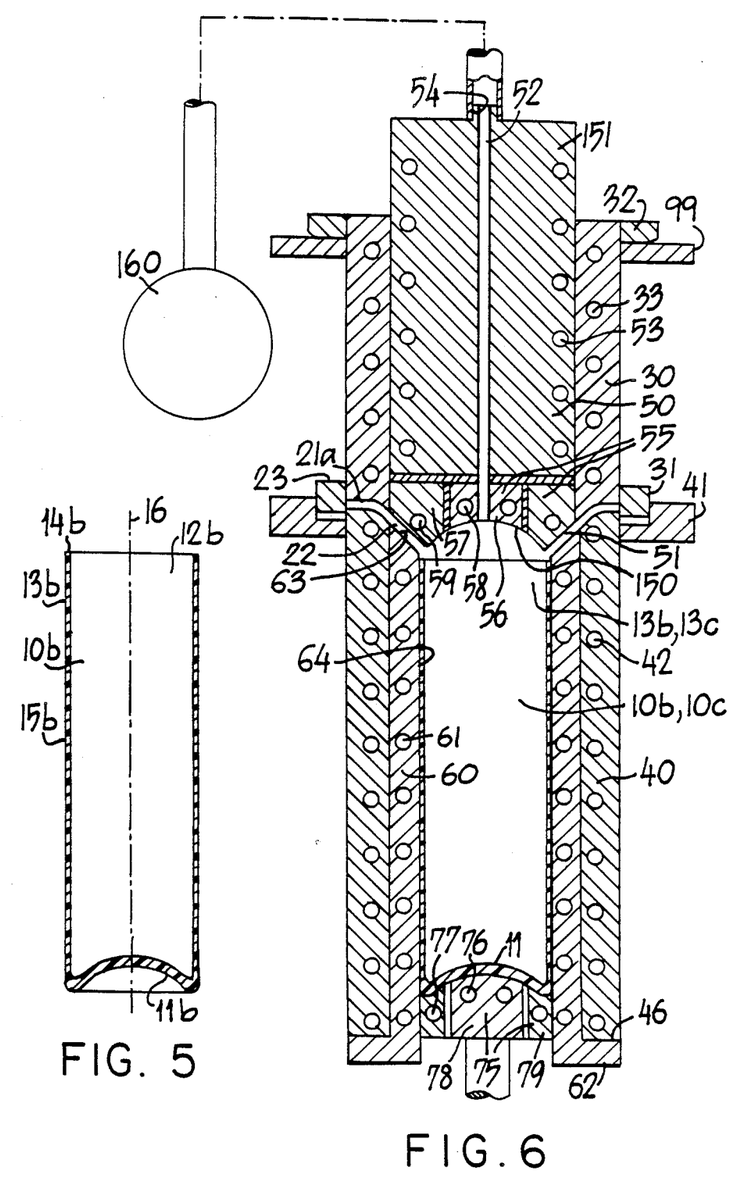
FIGS. 6–9 show successive stages of the expansion of the preform in its circumferential direction.

FIG. 5 shows an intermediate preform $10b$, formed by axial stretching of preform 10. The intermediate preform has a bottom section $11b$, a mouth $12b$, a ribbon-shaped mouth edge region $13b$, a mouth edge $14b$, an axially directed wall $15b$ and a center axis 16, i.e. the parts of the intermediate preform have reference numerals directly equivalent to those used for the preform 10 described in connection with FIG. 1.

FIGS. 6–9 show a basic embodiment of an apparatus in accordance with the invention. These Figures show an upper sleeve 30 and a lower sleeve 40 provided with channels 42 for temperature setting of the respective sleeve which is assumed to occupy a spatially fixed position, e.g. sleeve 40 is affixed to a frame (not shown). The upper sleeve 30 is provided with channels 33 for flow of a fluid for temperature setting of the sleeve, in addition to which there is disposed inside the sleeve a mandrel 50 which by drive means (not shown in the Figure) is displaceable relative to the upper sleeve in the axial direction of the sleeve. The part 55 of the mandrel facing the lower sleeve 40, hereinafter termed the bottom section, has a shape mainly adapted to the shape of the bottom $11b$ of the intermediate preform $10b$, and is in the embodiment shown in the Figure thermally insulated from the rest of the mandrel, hereinafter termed the upper section 151 of the mandrel. The bottom section has, in turn, a central section 56 which is thermally insulated from the outer circumferential portion 57 of the bottom section. In the bottom section there are disposed channels 58,59 for temperature setting of the central section of the bottom section and its circumferential portion, respectively. The upper section 151 of the mandrel is also provided with channels 53 for temperature setting. The upper section of the mandrel, the central section of the bottom section, and its circumferential portion are thus individually adjustable to required temperatures. A channel 52 for a pressure medium is disposed in the mandrel and is joined in the upper section of the mandrel via a connection device 54 to a pressure source 160, and is disposed in the lower section of the bottom section in order to open into the lower limiting surface 150 of the bottom section. Inside the lower sleeve 40 there is disposed an inner sleeve 60, displaceable in the axial direction of the sleeve 40 by drive means (not shown in the Figures), the inner surface 64 of which has a shape primarily in correspondence with the outer surface of the intermediate preform. Channels 61 are provided for temperature setting of the inner sleeve.

A bottom support 75 is disposed inside the inner sleeve 60 for axial displacement therein by drive means (not shown in the Figures). In certain embodiments the bottom support is divided into a central section 78 and an outer circumferential section 79, thermally insulated from the former, corresponding to what has been shown in respect of the bottom section 55 of the mandrel. Channels 76,77 for temperature setting of the bottom support are disposed therein, for which reason the central section of the bottom support and its circumferential section are also individually adjustable to required temperatures.

The upper sleeve 30 is provided with an upper stop device 32 which engages with an upper check (stop) device 99 e.g. adjustably affixed to the aforementioned frame and placed in a position such that when the upper stop device 32 abuts the upper check device 99 there is formed between the upper sleeve 30 and the lower sleeve 40 a columnar cavity $21a$ the breadth of which (the distance between the upper and the lower device in the Figure) exceeds the wall thickness of the circumferential mouth edge region $13b,c$ of the intermediate preform $10b,c$. In the vicinity of the outer end region of the columnar cavity there is a device 23 which blocks cavity $21a$ entirely or partially.

Figure 7:
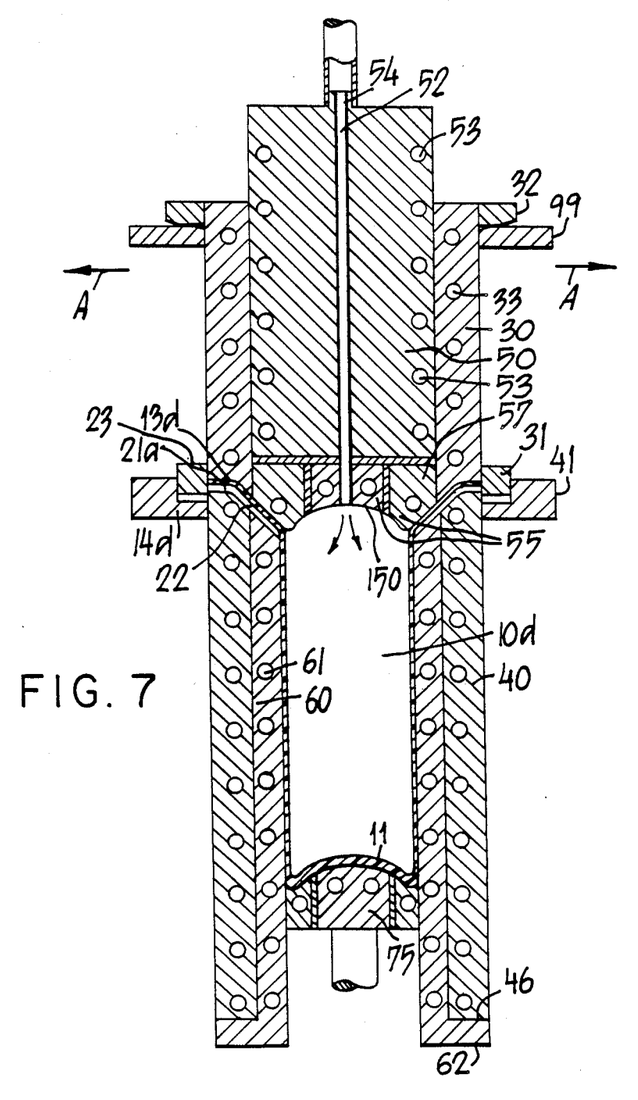
Figure 8:
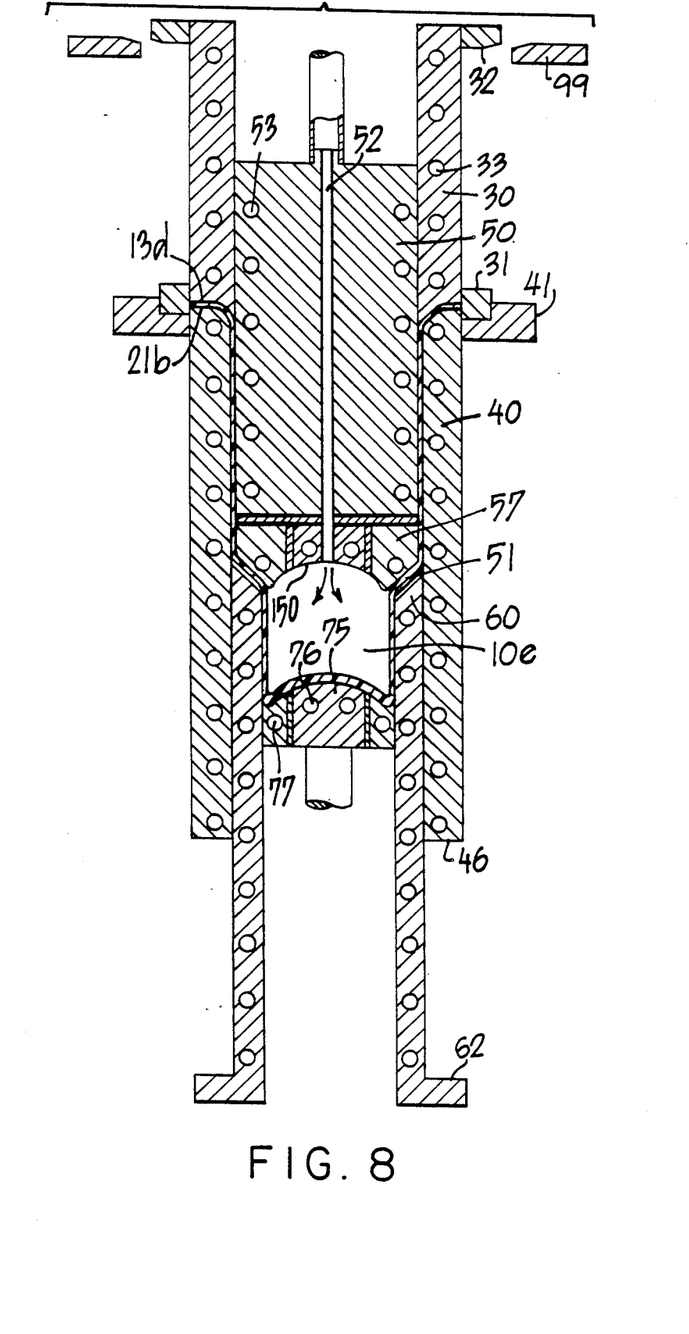

The upper check device 99 can be displaced by the displacement devices (not shown in the Figures) to assume a position where it engages the stop device 32 and a position where the stop device 32 can at least partly travel therepast, whereby the upper sleeve 30 can be moved nearer to the lower sleeve 40 (cf. arrows A in FIG. 7).

The inner sleeve 60 is provided with stop devices 62 which in the upper position of the sleeve abut check (stop) devices 46 in the lower sleeve 40. The stop device 62 and the check device 46 establish during abutment, that the upper limitation surface 63 of the inner sleeve 60, which surface has a shape substantially corresponding to that of the bottom section 55 of the mandrel, forms with said bottom section a columnar cavity 22 with a breadth somewhat exceeding the wall thickness in the mouth of the preform edge region. The cavity 22 connects with the cavity $21a$ so that the two cavities together comprise a linked slot $21a$-22 the width of which somewhat exceeds the thickness of the mouth of the preform edge region. The bottom section 55 of the mandrel has a design such that its lower limitation surface 150, in a region 51 adjacent the upper limitation surface 63 of the inner sleeve 60, has a downwards and outwards directed location with the result that the limitation surface in this region comprises a guide surface delimitating the columnar cavity 22. In the case of a divided bottom section the guide surface is located on the circumferential outer portion 57 of the bottom section.

The upper sleeve 30 is provided with another stop device 31 which engages a check (stop) device 41 disposed on the lower sleeve 40. The stop device 31 and the check device 41 have a mutual location such that when the stop device 31 abuts against the check device 41 a cavity $21b$ (FIG. 9) is formed between the upper sleeve and the lower sleeve, the cavity being of a slot-like shape having a width somewhat less than the wall thickness of the intermediate preform. In FIGS. 6–9, the stop device 31 also forms the device 23 which blocks the columnar cavity $21b$ outwards. Finally, it should be mentioned that in FIGS. 6–9 the intermediate preform has reference characters 10c to 10f, which refer to the actual reshaping stage of the preform.

Figure 11:
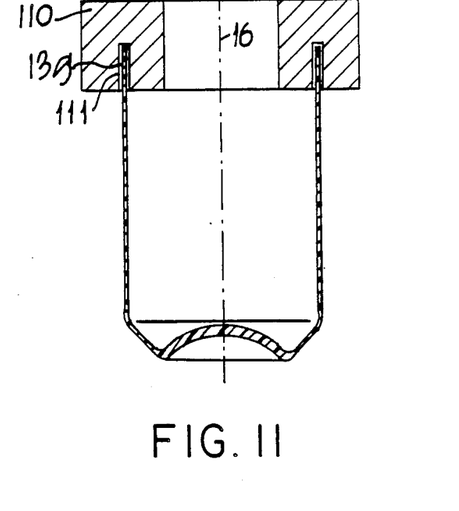

FIGS. 10–13 show a reshaped intermediate preform 10g which, compared with the intermediate preform 10c in FIG. 6, has an increased cross-section. In FIG. 11 the ribbon-shaped mouth edge region 13g of the reshaped intermediate preform has been inserted into a slot-shaped recess 111 in a heating device 110.

Figure 12:
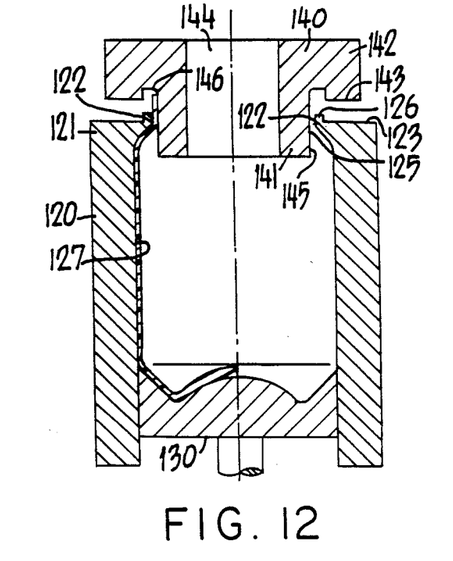
Figure 13:
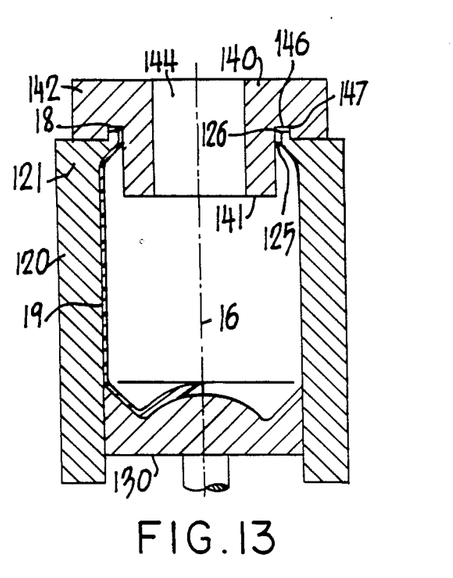

FIGS. 12–13 show an outer sleeve 120 having an inner surface 127 which in the upper section 121 of the sleeve, continuously merges into an inner mouth surface 122 with a reduced circumference. A bottom support 130 is supported for displacement within the sleeve by drive means (not shown in the Figures) in the axial direction of the sleeve. In addition, FIGS. 12–13 show an upper mandrel 140 with a lower, primarily cylindrical section 141 and an upper section 142 with a greater circumference than the cylindrical section. The lower cylindrical section of the mandrel is adapted to the mouth surface 122 of the outer sleeve such that there is formed between the outer limitation surface 145 of the mandrel an inner mouth surface 122, a slot 125 with a breadth somewhat exceeding the material thickness of the mouth edge region 13g of the preform. The outer surface 145 of the mandrel has, in the transition between the lower section 141 and the upper section 142, a shape adapted to the shape of the upper surface 126 of the outer sleeve 120 and forms after the transition a surface 146 primarily parallel to the upper surface of the sleeve in order to form a cavity or a slot 147 between the upper section 142 of the mandrel and the upper section 121 of the sleeve 120, when the mandrel is in its lower position; the cavity 147 forms a continuation of the slot 125, having a breadth that allows the edge region 13g of the reshaped intermediate preform to be inserted into the cavity. The outer sleeve 120 and the mandrel 140 are provided with stop surfaces 123 and 143 respectively, which guarantee the intended distance in the axial direction between the sleeve and the mandrel and thus the intended breadth of the cavity or slot 146. The upper mandrel is, in certain embodiments, also provided with a channel 144 which, in certain applications, is used in order to supply a pressure medium to the interior of the preform 10g during its reshaping.

Figure 2:
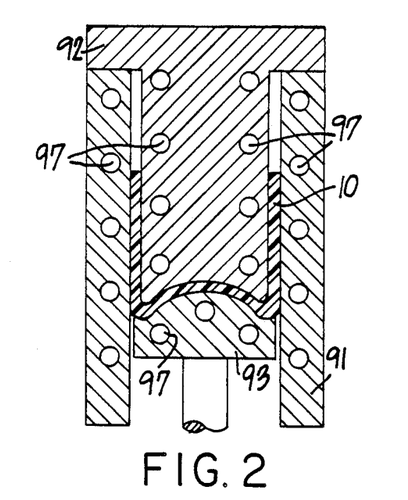

In a preferred embodiment of the invention, the preform 10 is inserted in apparatus 91–93 for setting of the material of the preform, at least in its primarily cylindrical section, to a suitable shaping temperature, preferably to a temperature exceeding the glass transition temperature of the material (cf. FIG. 2). The heated preform is then moved to the apparatus illustrated in FIG. 3 in which the wall thickness of the preform is reduced during simultaneous axial extension of the wall as well as orientation and/or crystallization of its material (cf. FIGS. 3 and 4) for formation of the intermediate preform 10b, the primarily cylindrical section, of which consists of stretched and oriented and/or crystallized material. FIG. 3 shows the preform during reshaping into the intermediate preform 10b. In the orientation/crystallization, the material passes through the slot 90, by which means the material in a preferred embodiment of the invention obtains an orientation equivalent to that which occurs during material flow. As it moves into the slot, the material generally has a temperature exceeding its TG.

The intermediate preform 10b thus formed is then placed in the reshaping device 30,40,50,60,75 illustrated in FIGS. 6–9. The intermediate preform is reshaped into an expanded intermediate preform 10f in the reshaping device. In order to allow reshaping, the intermediate preform 10b is first placed in a position where it is enclosed by the inner sleeve 60 and abuts the bottom support 75. In this position, a temperature conditioning of the intermediate preform 10b generally takes place, in that the inner sleeve has a temperature generally somewhat exceeding the glass transition temperature of the material (cf. FIG. 6). If this temperature conditioning is performed at a temperature which exceeds the temperature which the material has when passing through the slot 90, the intermediate preform shrinks axially. In FIG. 6 these two alternatives are denoted in that the intermediate preform has reference characters 10b and 10c, respectively, where 10c indicates that the intermediate preform has shrunk during the temperature conditioning.

The bottom support 75 is subsequently displaced upwards (cf. FIG. 7) at the same time as the interior 10d of the intermediate preform is pressurized by a pressure medium supplied via the channel 52 from the pressure source 160. In certain applications, the pressure medium is heated in order to maintain or at least contribute towards maintaining the material of the intermediate preform at the required temperature. The inner sleeve 60 and lower sleeve 40 thus have, relative to the mandrel 50 and upper sleeve 30 respectively, positions such that the previously described linked slot 21a,22 is formed. FIG. 7 shows an embodiment of the invention where this positional setting is achieved by the upper stop device 32 when engaging the upper check device 99 and by the lower stop device 62 when engaging the lower check device 46. The relative locking between the devices means that during the upwards motion of the bottom support, the mouth edge 14b,14c of the intermediate preform as well as the adjoining mouth edge region 13b,13c are displaced into the slot during simultaneous increase of the circumference of the intermediate preform in its mouth 12b,12c. This displacement of the bottom support 75 and thus the intermediate preform continues until the mouth edge 14d reaches the stop device 31 of the upper sleeve 30. In certain embodiments, the circumferential outer portion 57 of the bottom section has an elevated temperature (a temperature exceeding TG) in order to make the material more adapted to expand in the circumferential direction.

The upper check device 99 is subsequently displaced to the position where it can be passed by the stop device 32 (cf. FIG. 8), after which the upper sleeve 30 is displaced towards the lower sleeve 40 until the stop device 31 of the upper sleeve abuts against the check device 41 of the lower sleeve. In this position, the material portions 13d are clamped in place next to the expanded mouth edge of the intermediate preform (i.e. equivalent to the ribbon-shaped circumferential mouth edge region 13d) between the upper sleeve and the lower sleeve. In the abutment regions for the material portions, the sleeves have temperatures in excess of TG.

Figure 9:
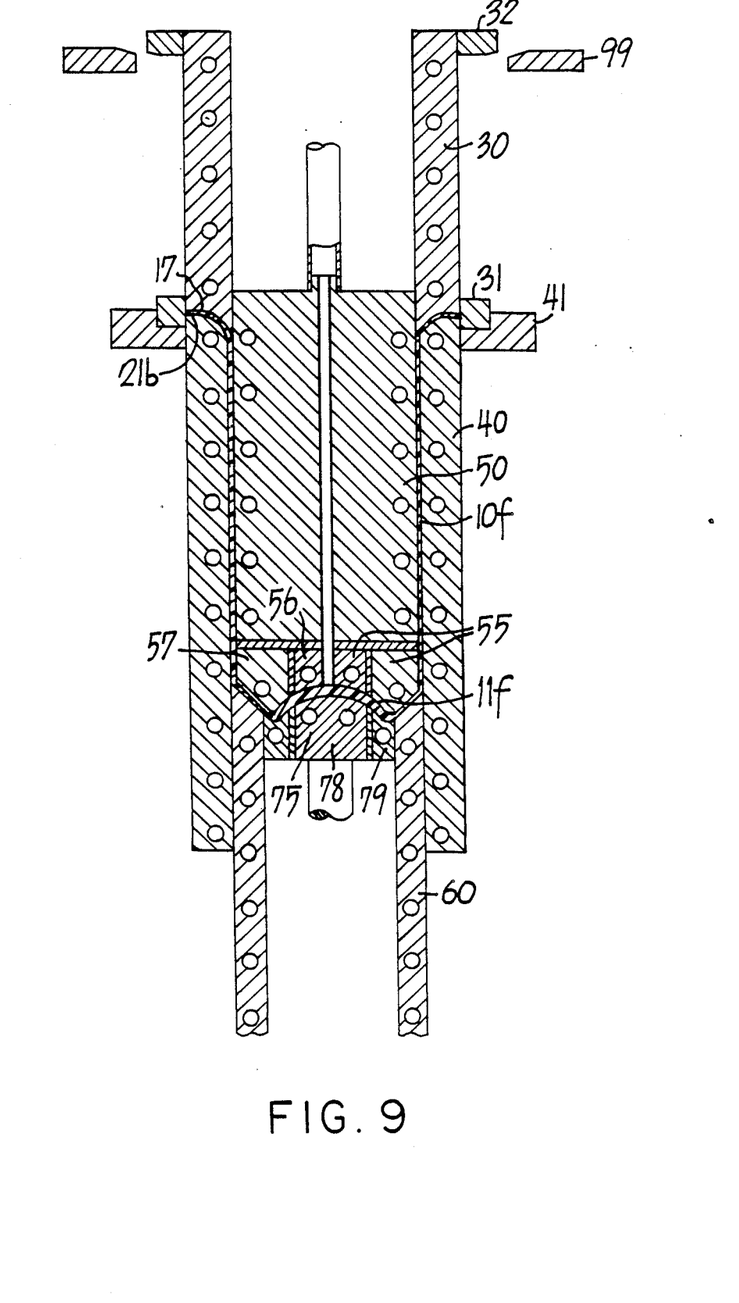
Figure 10:
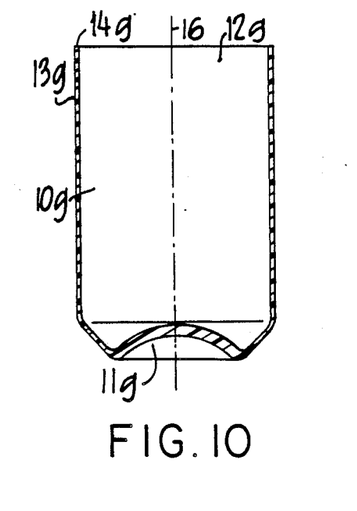
FIGS. 10–13 show successive stages of the reshaping of the expanded preform into a container.

The inner sleeve 60 is subsequently displaced downwards in the Figures at the same time as the mandrel 50 which successively expands the intermediate preform in its circumferential direction. The mandrel thus has, at least in the region 51 where it abuts the material of the intermediate preform, a temperature above the TG of the material. As a rule, the downwards movements of the mandrel 50 and the inner sleeve 60 are synchronized so that the aforementioned slot 22 is maintained between the bottom section of the mandrel and the upper portions of the sleeve. By retaining the material in the mouth region of the intermediate preform in place, the intermediate preform is kept fixed between the upper sleeve 30 and the lower sleeve 40 whereby during the expansion the material in the intermediate preform is also subjected to axially directed stretching forces through the movement of the mandrel. As a rule, the bottom support 75 is simultaneously allowed to exert an upwardly directed force on the intermediate preform to reduce the magnitude of the stretching forces in the material of the intermediate preform, when this material is pressed upwards over and expanded by the mandrel. Practically, it has been shown that the retention of the edge portions of the intermediate preform achieves a good result in production and a high production capacity. In those applications where the retention effect is supplemented by an upwardly directed pressing force from the bottom support 75, both a further improved result and a shortened cycle time are generally achieved. FIG. 9 shows the shaping devices after a completed movement and the expanded intermediate preform 10f.

Immediately after expansion, the expanded material of the intermediate preform abuts against the outer surface of the mandrel 50, and as a rule also the inner surface of the lower sleeve 40. These two surfaces preferably have a temperature exceeding the TG of the material and as a rule one considerably exceeding the TG, whereby, the material is temperature-stabilized while retaining the shape that was determined by the lower sleeve 40 and the mandrel 50. The selected temperature of both the sleeve and the mandrel and thus the temperature up to which temperature stability is achieved is determined by the maximum temperature at which the product which is being shaped is intended to be used. Thus, for polyethylene terephthalate (PET), containers have been manufactured which are temperature-stable up to approximately 160° C. in that the inner surface had a temperature exceeding 160° C. In certain applications, the mandrel 50 is also given a corresponding increased temperature. As will be evident from FIG. 9 the expanded intermediate preform 10f has in its mouth section an outwards-facing edge flange 17. In certain applications this is cut off, whereby the expanded intermediate preform 10g is formed (cf. FIG. 10).

As will be evident from the above description, the bottom section 55 of the mandrel 50 also includes both the central bottom section 56 and the circumferential outer portion 57, which are adjustable to specific temperatures independently of each other. The bottom support 75 is likewise disposed with similarly separated sections 78,79. In certain applications this enables separate heat treatment of the material in the bottom section 11f,11g of the expanded intermediate preform so that when the material has a low crystallization it is possible to thermally increase the same in order to achieve temperature-stable and shape-stable material portions. Thus, it is possible in accordance with the invention to obtain in the bottom section of the intermediate preform annular opaque material portions or disclike ones.

FIGS. 10-13 illustrate an embodiment of the invention where the expanded intermediate preform 10g after its mouth flange has been cut is reshaped in its mouth section. For this purpose, the ribbon-shaped circumferential mouth edge region 13g of the intermediate preform is inserted into the slot-shaped recesses 111 in the heating device 110. The material is thus heated to a temperature somewhat exceeding the aforementioned maximum temperature at which the container which is being manufactured is intended to be used.

The intermediate preform expanded in this manner is subsequently introduced into the sleeve 120 for reshaping of the mouth 12g of the intermediate preform. By means of relative motion between the bottom support 130 and the sleeve 120 the heated material is pressed into the slot 125 between the mandrel 140 and the upper section 121 of the sleeve 120 of a reduced diameter, whereby the circumference of the expanded intermediate preform in the mouth section is reduced. By means of a subsequent relative movement between the mandrel 140 and the sleeve 120 while simultaneously supporting the intermediate preform by the bottom support 130 (with the interior of the intermediate preform being pressurized if necessary or required) upper edge portions of the intermediate preform are folded outwards and move into the slot 147 between the upper section 142 of the mandrel and the upper section 121 of the sleeve for the formation of an outwardsfacing flange 18. Thus, an embodiment of a hollow body (container) 19 in accordance with the invention is completed.

In the above description the expressions upper, lower, vertical, etc. have been used, which should, however, be considered solely as a means of facilitating the description. It is evident that in accordance with the invention the apparatus can assume arbitrary orientations. It is also possible, within the scope of the invention, to allow the preform, intermediate preform, and the finished container to have an arbitrary cross-section which may also have a different shape in different sections of both preform, intermediate preform, and finished container. The reshaping of the mouth section described in the preceding paragraph is also applicable to intermediate preforms of non-circular cross-section. The technique is also applicable to shape non-circular into circular mouth portions.

The above detailed description has solely referred to a limited number of embodiments of the invention, but it will be readily understood by those skilled in the art, that the invention includes a large number of embodiments within the scope of the following claims.

I claim:
1. A method of shaping a substantially tubular preform of deformable plastic material into a hollow body, said method comprising:
   providing a tubular preform of deformable plastic material having a closed bottom, an open mouth and a tubular wall between the bottom and the mouth,
   positioning a mandrel at the open mouth of the tubular preform in spaced relation from the closed bottom of the preform so that the interior of the preform is hollow and unoccupied, the mandrel having an outer diameter which is greater than the inner diameter of the tubular preform,
   forming an outwardly flared edge portion on said preform at said open mouth,
   clamping said flared edge portion of the preform between mechanical clamping devices around and outside said mandrel, and
   relatively displacing said mandrel and said mechanical clamping devices to cause said mandrel to move into the hollow interior of said tubular preform causing the wall of the preform to progressively expand circumferentially while said open mouth remains clamped by said mechanical clamping devices.

2. A method as claimed in claim 1 comprising forming the mandrel with a conical end on which relative movement takes place between the wall of the preform and the mandrel during the progressive expansion of the wall causing increase in diameter of the tubular body.

3. A method as claimed in claim 2 wherein the inner surface of the wall of the preform is pressed against the conical end of the mandrel during said progressive expansion of the wall while the outer surface of the wall of the preform is not contacted.

4. A method as claimed in claim 2 wherein as the wall of the preform is progressively expanded on the conical end of the mandrel, said wall travels in a gap so that the outer surface of the wall travels freely in the gap without restraint.

5. A method as claimed in claim 1 comprising supporting the preform within a surrounding sleeve which is substantially immovable relative to the mandrel.

6. A method as claimed in claim 5 wherein said tubular wall of said preform is axially stretched and reduced in thickness to provide axial orientation of the plastic material prior to the circumferential expansion.

7. A method as claimed in claim 6 wherein said axial orientation corresponds to that obtained by stretching of the material to produce material flow.

8. A method as claimed in claim 1 wherein said flared edge portion is formed by axially displacing the preform relative to the mandrel to cause the open mouth of the preform to be expanded by the mandrel.

9. A method as claimed in claim 1 comprising supporting the preform within a surrounding sleeve which is substantially immovable relative to the mandrel, the material of the preform at said open mouth passing through a gap formed between the mandrel and the sleeve during the formation of said flared edge portion.

10. A method as claimed in claim 9 wherein said flared edge portion enters between the mechanical clamping devices before being clamped thereby.

11. A method as claimed in claim 10 wherein said clamping devices heat the clamped edge portion to a temperature above the glass transition temperature (TG) of the material.

12. A method as claimed in claim 9 comprising effecting heat transfer between the sleeve and the preform.

13. A method as claimed in claim 12 wherein said heat transfer produces a temperature of the preform of a value above the glass transition temperature (TG) of the material.

14. A method as claimed in claim 12 wherein the temperature of the sleeve is in the range of 30° C. below TG to about 70° C. above TG.

15. A method as claimed in claim 9 comprising heating the preform after circumferential expansion to a temperature above TG.

16. A method as claimed in claim 15 wherein said heating of the circumferentially expanded preform comprises transferring heat to the preform from a sleeve surrounding the preform.

17. A method as claimed in claim 15 wherein said heating of the circumferentially expanded preform comprises transferring heat to the preform by said mandrel.

18. A method as claimed in claim 1 comprising supporting the closed bottom of the preform on a bottom support which is substantially immovable with respect to said clamping devices.

19. A method as claimed in claim 18 comprising effecting heat exchange between the closed bottom of the preform and the bottom support.

20. A method as claimed in claim 1 comprising pressurizing the interior of the preform during circumferential expansion thereof.

21. A method as claimed in claim 20 wherein the pressurizing of the interior of the preform is effected by conveying a pressure medium through a channel in the mandrel into the hollow interior of the preform.

22. A method of shaping an open mouth of a substantially tubular preform of deformable plastic material, said method comprising:
supporting a tubular preform in a tubular sleeve with a closed bottom of the preform resting on a bottom support which is relatively displaceable in said sleeve, relatively displacing said tubular sleeve and said bottom support to axially displace the preform relative to the sleeve, applying force from the sleeve to the preform inwardly of the preform at an edge region of an open mouth of the preform to displace the edge region inwardly around the circumference of the tubular preform to provide said edge region with a reduced diametral extent compared to the diametral extent of the remainder of the tubular preform,
inserting a mandrel into said sleeve to form a circumferential gap therewith, said sleeve causing said edge region to pass in said gap as the preform is axially displaced relative to said sleeve to produce said inward displacement of said edge region and, relatively moving said mandrel and said sleeve to fold a terminal end portion of said edge region outwardly to form an outwardly facing flange on said edge region.

23. A method as claimed in claim 22 comprising heating the said edge region prior to the inward displacement thereof.

24. A method as claimed in claim 22 wherein the material at the edge region of said preform is oriented.

25. A method as claimed in claim 22 comprising pressurizing the interior of the preform during the inward displacing of the edge region by conveying a pressure fluid through said mandrel into the interior of the preform.

26. A method of shaping a substantially tubular preform of deformable plastic material into a hollow body, said method comprising:
clamping an outer peripheral edge region of a flared edge portion of a tubular preform between mechanical clamping devices, the tubular preform having a closed bottom, a tubular wall and an open mouth at said flared edge portion,
supporting the tubular wall of the preform in an inner sleeve,
positioning a mandrel at the open mouth of the tubular preform in spaced relation from the closed bottom of the preform so that the interior of the preform is hollow and unoccupied,
slidably supporting the mandrel in a first outer sleeve,
slidably supporting said inner sleeve in a second outer sleeve which is axially aligned with said first outer sleeve,
the first outer sleeve being formed with an inner diameter less than the inner diameter of said second outer sleeve and
relatively moving the mandrel and said inner sleeve as a first unit with respect to said first and second outer sleeves and said mechanical clamping devices as a second unit to cause penetration of said mandrel into the hollow interior of the preform such that the wall of the preform is circumferentially expanded and travels over an outer axial end of said mandrel closest to said closed bottom of said preform and then between said second outer sleeve and the mandrel to form a hollow body having a larger diameter than the diameter of the tubular preform.

* * * * *